(12) United States Patent
Petersson

(10) Patent No.: US 8,491,064 B2
(45) Date of Patent: Jul. 23, 2013

(54) METHOD AND A SYSTEM FOR BRAKING A VEHICLE

(75) Inventor: Mikael Petersson, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 356 days.

(21) Appl. No.: 12/811,626

(22) PCT Filed: Jan. 22, 2008

(86) PCT No.: PCT/SE2008/000053
§ 371 (c)(1),
(2), (4) Date: Jul. 2, 2010

(87) PCT Pub. No.: WO2009/093935
PCT Pub. Date: Jul. 30, 2009

(65) Prior Publication Data
US 2010/0292049 A1 Nov. 18, 2010

(51) Int. Cl.
*B60T 13/74* (2006.01)
(52) U.S. Cl.
USPC .............. 303/186; 188/264 E; 188/264 F; 180/65.6
(58) Field of Classification Search
USPC ............ 303/146, 152, 155, 186–190; 701/53, 701/70; 192/215, 216, 219; 180/65.1, 65.6
See application file for complete search history.

(56) References Cited

U.S. PATENT DOCUMENTS

| | | | |
|---|---|---|---|
| 5,050,939 A * | 9/1991 | Middelhoven et al. | 303/71 |
| 5,105,923 A | 4/1992 | Iizuka | |
| 7,255,407 B2 * | 8/2007 | Hamada et al. | 303/9.62 |
| 2001/0016795 A1 * | 8/2001 | Bellinger | 701/53 |
| 2006/0021810 A1 * | 2/2006 | Crombez | 180/65.2 |
| 2006/0113833 A1 * | 6/2006 | Lingman et al. | 303/3 |

FOREIGN PATENT DOCUMENTS
EP 1044843 A2 10/2000

OTHER PUBLICATIONS

International Search Report for corresponding International Application PCT/SE2008/000053.
International Preliminary Report on Patentability for corresponding International Application PCT/SE2008/000053.

* cited by examiner

Primary Examiner — Christopher Schwartz
(74) Attorney, Agent, or Firm — WRB-IP LLP

(57) ABSTRACT

A method for braking a vehicle is provided, wherein the vehicle includes a circuit adapted for transmitting a brake signal from an operator controlled braking element to brake devices arranged at a plurality of the vehicle's ground engaging elements via a brake fluid. The method includes detecting a fluid pressure in the circuit, using the detected fluid pressure level as an input for determining a brake power for at least one auxiliary brake in the vehicle, and controlling the auxiliary brake responsively.

30 Claims, 3 Drawing Sheets

METHOD AND A SYSTEM FOR BRAKING A VEHICLE

BACKGROUND AND SUMMARY

The present invention relates to a method for braking a vehicle, wherein the vehicle comprises a circuit adapted for transmitting a brake signal from an operator controlled braking element to brake devices arranged at a plurality of the vehicle's ground engaging elements via a brake fluid. The invention also relates to a corresponding system.

The invention is especially directed to a system where the operator controlled braking element (for example a foot pedal) upon depression acts on a valve and thereby directly controls the brake devices via the fluid. Work machines, such as dump trucks and especially articulated haulers, have such systems, wherein the brake devices (wheel brakes) are operated via a hydraulic circuit.

The invention will below be described for an articulated hauler. This should however be regarded as a non-limiting example, wherein the invention may be realized in other types of work machines, such as wheel loaders, or other types of vehicles, such as trucks.

An articulated hauler is defined by a pivot joint arranged to allow a front frame and a rear frame to pivot in relation to each other around an imaginary longitudinal axis, that is an axis that runs in the longitudinal direction of the vehicle. Travelling on uneven ground is substantially improved by virtue of such a joint. Further, an articulated hauler normally has six wheels. A front wheel axle is arranged at the front frame and a pair of bogie axles is arranged at the rear frame.

In connection with transportation of heavy loads, e.g. in contracting work, a work machine of the type of an articulated hauler is frequently used. Such vehicles may be operated with large and heavy loads in areas where there are no roads, for example for transports in connection with road or tunnel building, sand pits, mines and similar environments.

The articulated hauler has several brake functions. A primary brake function is achieved via wheel brakes. One brake device is arranged for braking an individual wheel. The wheel brakes are preferably formed by disc brakes. A secondary brake function is achieved via one or several auxiliary brakes to assist the wheel brakes with controlling or decelerating the vehicle. More specifically, the auxiliary brake is adapted to brake the rotational speed of an element in the vehicle's powertrain.

The auxiliary brake may comprise an engine brake and/or a transmission brake (which is called a retarder in an automatic gearbox). The engine brake may be formed by a compression and/or exhaust brake integrated into the engine. The transmission retarder may be formed by a hydraulic retarder that acts inside the transmission. The retarder may be formed by a hydraulic or flow brake for braking a transmission output against a relatively fixed or stationary part. The engagement and disengagement of the retarder can take place by filling and emptying of the hydraulic brake. There is also a parking brake function in an articulated hauler, which is adapted for preventing the hauler from moving from a standstill.

In a known articulated hauler, a brake pedal is not only arranged for controlling the wheel brakes but also for controlling the retarder function. More specifically, only the retarder function is activated when the brake pedal movement is increased from zero or rest position to a specific, intermediate point in its movement range. More specifically, an electric sensor is adapted to sense when the brake pedal is deflected and the retarder function is applied to exert full brake power responsively. The wheel brakes are activated upon further pedal deflection past the specific intermediate point and act together with the retarder function in that subsequent pedal deflection range. More specifically, the foot pedal acts directly on a valve in a hydraulic circuit, which is adapted to control the wheel brakes, in the subsequent pedal deflection range It is desirable to achieve a method which creates conditions for a variable and safe braking in a cost-efficient way.

A method according to an aspect of the present invention comprises detecting a fluid pressure in the circuit, using the detected fluid pressure level as an input for determining a brake power for at least one auxiliary brake in the vehicle, and controlling the auxiliary brake responsively.

Thus, brake power is achieved directly via the wheel brakes upon deflection of the brake pedal. In addition to the wheel brake power, brake power can be apportioned variably to the auxiliary brake (s). The invention creates further conditions for adjusting the amount of brake power to each individual auxiliary brake depending on the detected fluid pressure level.

Further, detecting a fluid pressure level in the wheel brake circuit is a cost-efficient way of achieving a reliable input signal for determining a brake power for the auxiliary brake.

According to a preferred embodiment, the method comprises the step of determining a relationship between the brake power of the brake devices at the ground engaging elements and the brake power of the auxiliary brake. In other words, the brake power is apportioned in a certain way as a function of the detected pressure in the wheel brake circuit. Specifically, the brake power of the auxiliary brake is calculated based on the detected pressure in the wheel brake circuit. Especially, the method comprises the step of determining a higher brake power portion of the auxiliary brake at a higher circuit pressure.

According to a preferred embodiment, the method comprises the step of determining the auxiliary brake power in response to an available cooling power of the brake devices. This step creates conditions for applying a relatively high brake power via the auxiliary brake and thereby reducing wear on the wheel brakes in certain operating conditions.

According to a further preferred embodiment, the method comprises the step of detecting at least one vehicle operational parameter and using the operational parameter signal as a further input for determining the brake power for said at least one auxiliary brake. In other words, the relative proportions of the brake power of the wheel brakes and the auxiliary brake are altered for different conditions. Of course, also the relative proportions of the brake power to each of the auxiliary brakes may be altered for different conditions.

The operational parameter may for example indicate the vehicle speed, a current gear or a slip of one of the ground engaging element. Accordingly, a higher brake power portion of the auxiliary brake is determined for a higher speed and/or a higher gear and a smaller brake power portion of the auxiliary brake is determined at a higher slip.

According to a specific example, the auxiliary brake is controlled to exert full power already at low detected wheel brake pressure levels if the vehicle travels at high speed. On the other hand, at low vehicle speeds, the wheel brake pressure level has to be very high in order for the auxiliary brake to exert full power.

It is desirable to achieve a system which creates conditions for a variable and safe braking in a cost-efficient way.

A system for braking a vehicle according to an aspect of the present invention comprises a circuit adapted for transmitting a brake signal from an operator controlled braking element to brake devices arranged at a plurality of the vehicle's ground engaging elements via a brake fluid and means for detecting a fluid pressure in the circuit, characterized in that the system comprises means for determining a brake power for at least one auxiliary brake in the vehicle on the basis of the detected fluid pressure level, and means for controlling the auxiliary brake responsively.

Other advantageous features and functions of various embodiments of the invention are set forth in the following description and in the dependent claims.

BRIEF DESCRIPTION OF THE DRAWINGS

The invention will be explained below, with reference to the embodiments shown on the appended drawings, wherein.

DETAILED DESCRIPTION

Figure 1:
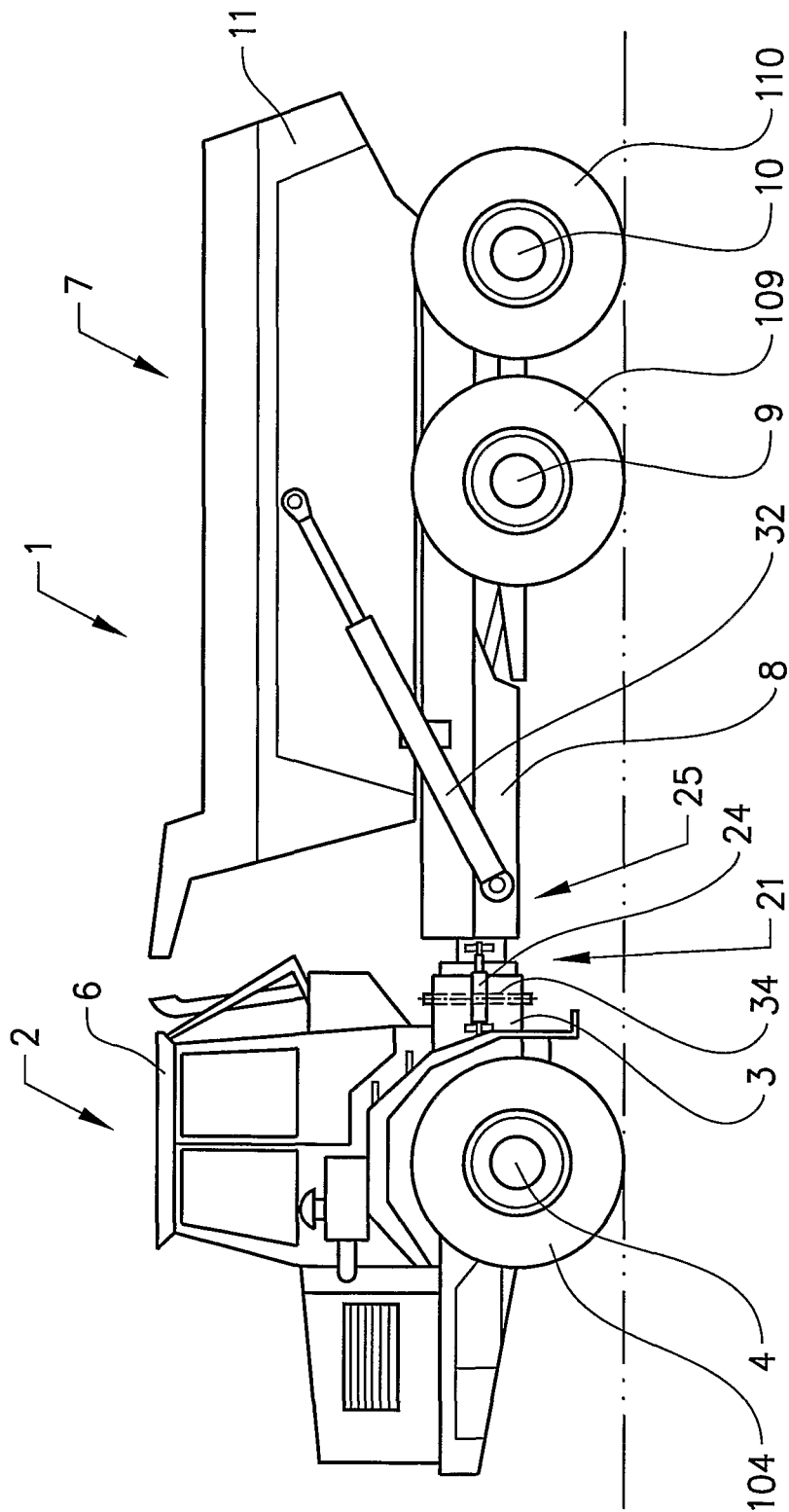
FIG. 1 shows an articulated hauler in a side view.

FIG. 1 shows an articulated hauler 1 in a side view.

The articulated hauler comprises a front vehicle section 2 comprising a front frame 3, a front axle 4 and a cab 6 for a driver. The articulated hauler 1 also comprises a rear vehicle section 7 comprising a rear frame 8, a front axle 9, a rear axle 10 and a tipping load container, or platform, 11.

The front and rear axles 9,10 in the rear vehicle section 7 are connected to the rear frame 8 via a bogie arrangement and will be referred to below as the front bogie axle 9 and rear bogie axle 10 respectively.

The front axle 4, the front bogie axle 9 and the rear bogie axle 10 each comprise a left ground-engaging element 104, 109,110 and a right ground-engaging element (not shown) in the form of wheels.

The front frame 3 is connected to the rear frame 8 via a first pivot joint 21 that allows the front axle 3 and the rear axle 8 to pivot relative to each other around a vertical pin 34 for steering (turning) the vehicle. A pair of hydraulic cylinders 24 are arranged one on each side of the pivot joint 21 for steering the vehicle. The hydraulic cylinders are controlled by the vehicle's driver via a steering wheel and/or a joystick (not shown).

A second pivot joint 25 is arranged to allow the front frame 3 and the rear frame 8 to pivot in relation to each other around an imaginary longitudinal axis, that is an axis that runs in the longitudinal direction of the vehicle 1.

Figure 2:
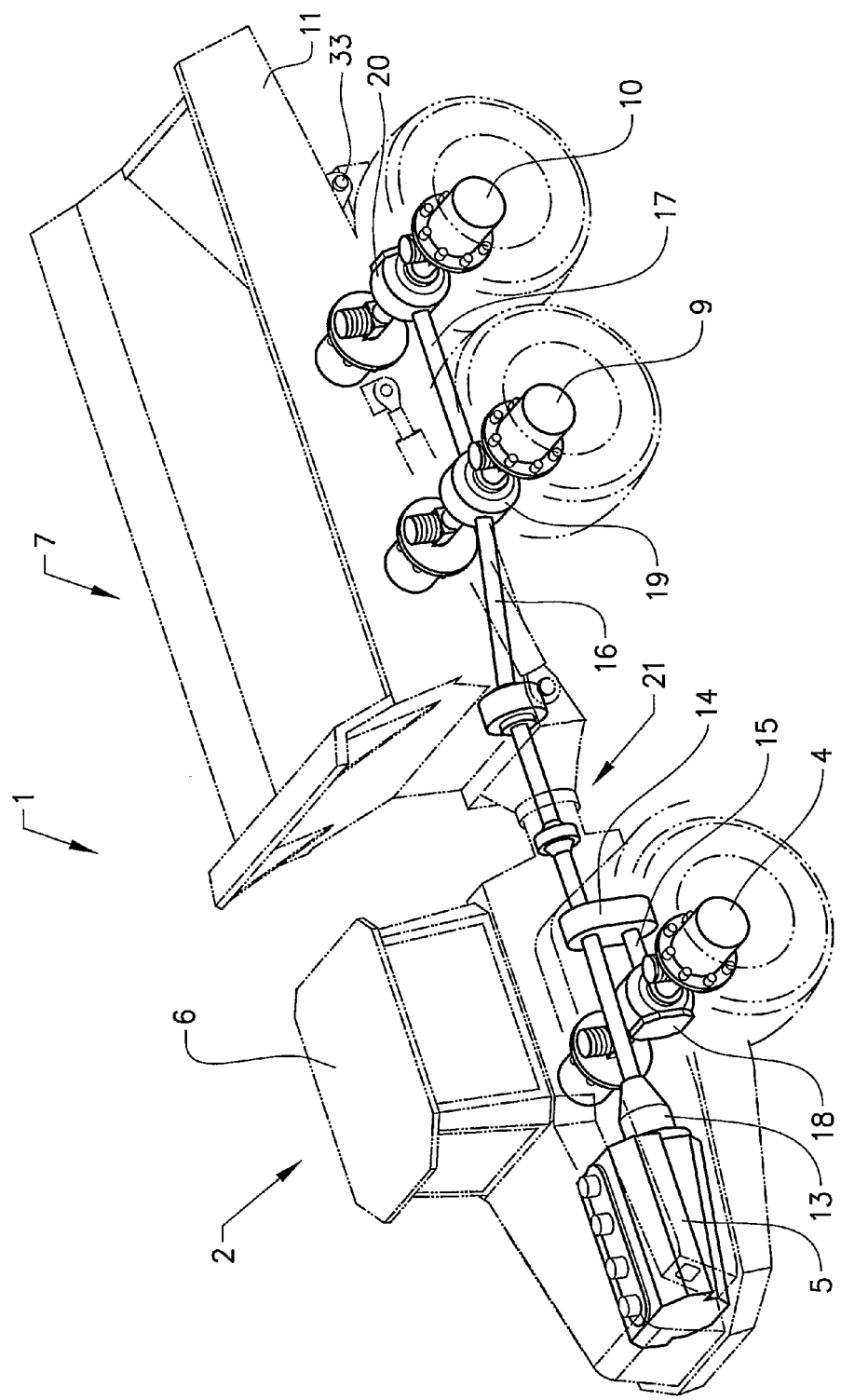
FIG. 2 shows schematically a powertrain of the hauler.

The load container 11 is connected to the rear frame 8 via a pivot point 33, see FIG. 2, at a rear part of the rear frame 8. A pair of tipping cylinders 32 is connected at a first end to the rear frame 8 and is connected at a second end to the load container 11. The tipping cylinders 32 are positioned one on each side of the central axis of the vehicle in its longitudinal direction. The load container 11 is thus tipped up in relation to the rear frame 8 upon activation of the tipping cylinders 32.

FIG. 2 shows schematically the powertrain of the vehicle 1. The powertrain comprises a power source (prime mover) in the form of a combustion engine, in this case a diesel engine 5, for propelling of the vehicle 1. The powertrain further comprises a main gearbox 13 in the form of an automatic gearbox, that is operationally connected to an output shaft from the engine 5. The main gearbox 13 has, for example, six forward gears and two reverse gears. The powertrain comprises, in addition, an distribution gearbox 14 (dropbox) for distributing the propulsive force between the front axle 4 and the two bogie axles 9,10.

First, second and third drive shafts 15,16,17 (universal drive shafts) run in the longitudinal direction of the vehicle and are each operationally connected to the distribution gearbox 14 and a differential 18,19,20 in each of wheel axles 4,9,10. A pair of transverse drive shafts (spline axles) runs in opposite directions from the respective differential. Each of the transverse drive shafts drives one of the said wheels.

Figure 3:
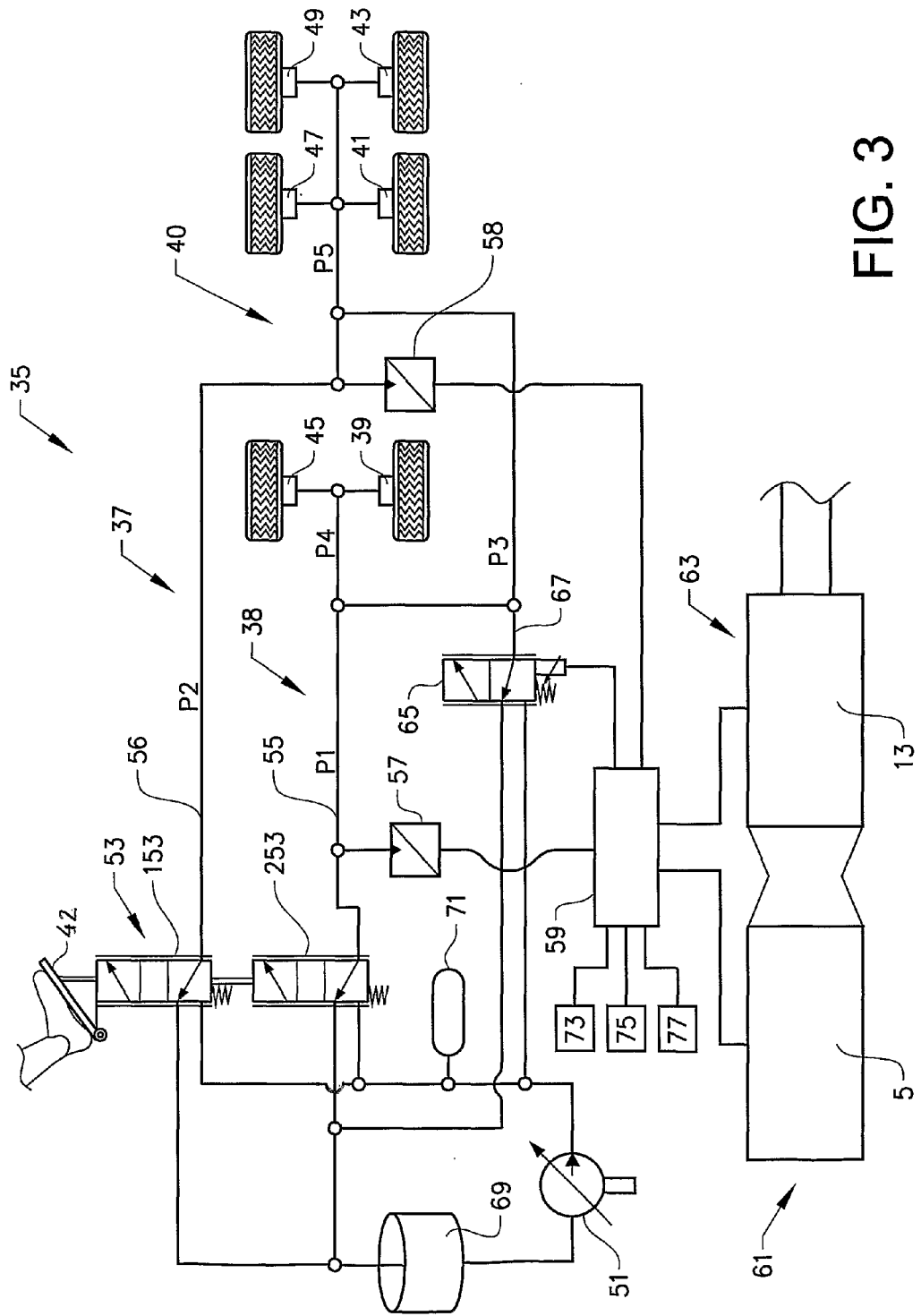
FIG. 3 shows a system for braking the hauler.

FIG. 3 shows a braking system 35 for the hauler 1. The system 35 comprises a circuit 37 adapted for transmitting a brake signal from an operator controlled braking element (brake pedal) 42 to wheel brake devices 39,41,43,45,47,49 arranged at each of the six wheels via a hydraulic brake fluid. The circuit 37 comprises a first circuit part 38 configured for controlling the brake devices 39,45 of the front axle wheels and a second circuit part 40 configured for controlling the brake devices 41,43,47,49 of the bogie axle wheels. By virtue of the two brake circuit parts, a wheel brake power is available even in case of a breakdown of one of the brake circuit parts. The wheel brake devices are formed by fluid pressure operated brakes and specifically by wet disc brakes.

The system 35 further comprises a pump 51 adapted to provide the hydraulic fluid in a pressurized state. The brake pedal 42 is adapted to act directly on a valve unit 53, which is arranged on a fluid line in order to control fluid communication between the pump 51 and the wheel brakes. The brake pedal 42 is adapted to act directly on a first valve unit part 253, which is arranged on a first fluid line 55 in order to control fluid communication between the pump 51 and the front axle wheel brakes 39,45. A second valve unit part 153 is arranged on a second fluid line 56 in order to control fluid communication between the pump 51 and the bogie axle wheel brakes 41,43,47,49. The first and second valve unit parts 153,253 are mechanically connected to each other so that they are moved in unison. Thus, the valve 53 is adapted to variably open and close, respectively the fluid flow connection between the pump and the wheel brakes. In other words, the operator controlled braking element is adapted to directly brake the wheels via the circuit.

At least one means 57,58 is adapted for detecting a fluid pressure in the circuit 37. A first detection means 57 is positioned in the first circuit part and a second detection means 58 is positioned in the second circuit part. The detection means 57,58 comprises a pressure sensor adapted to sense the pressure in the lines 55,56, respectively between the valve 53 and the wheel brakes. The pressure sensor is adapted to generate a fluid pressure electric signal indicative of the detected pressure.

The system further comprises means 59 for determining a brake power for at least one auxiliary brake in the vehicle on the basis of the detected fluid pressure level. Said auxiliary brake power determining means 59 is formed by a controller (or ECU, Electronic Control Unit) 59 and is adapted to receive the fluid pressure electric signal indicative of the detected pressure.

In a preferred embodiment, the controller 59 comprises a microprocessor. The controller comprises a memory, which in turn comprises a computer program with computer program segments, or a program code, for implementing the control method when the program is run. This computer program can be transmitted to the controller in various ways via a transmission signal, for example by downloading from another computer, via wire and/or wirelessly, or by installation in a memory circuit. In particular, the transmission signal can be transmitted via the Internet.

Further, the controller 59 is adapted to calculate a desired auxiliary brake power on the basis of the received signal indicative of the detected hydraulic fluid pressure. The controller 59 is further adapted to generate an electric signal indicative of the desired auxiliary brake power. In other words, the auxiliary braking pressure signal is generated indirectly depending on the braking level requested by the vehicle operator. In other words, a single brake pedal is used for controlling both wheel brakes and auxiliary brakes.

The system comprises a plurality of auxiliary brake functions. The auxiliary brake functions comprise an engine brake 61 and a transmission brake 63 (or retarder). The engine brake and transmission brake are both known per se and will not be further described in this document.

The apportionments of the wheel brake power and the auxiliary brake power and the timings of actuation and disabling are calculated in the controller. Further, in case there is a plurality of auxiliary brakes, also the apportionments and timings of the individual auxiliary brakes are calculated by the controller. Anyway, the auxiliary brakes are controlled as a function of the detected hydraulic fluid pressure level in the wheel brake circuit.

According to one example, the auxiliary brake power is decided in response to an available cooling power of the wheel brake devices. The transmission brake portion may be controlled so that the wheel brakes are not used to a higher extent than they can be effectively cooled.

The system further comprises means 73,75,77 for detecting at least one vehicle operational parameter and using the operational parameter signal as a further input for determining the brake power for said at least one auxiliary brake. Such vehicle operational parameters may be speed, current gear, traction and slip.

The system 35 comprises a further valve 65, which is arranged on a further fluid line 67 in order to control fluid communication between the pump 51 and the wheel brakes. The fluid line 67 is connected to the first fluid line 55 downstream of the position of the first pressure sensor 57. In other words, the valve 65 is adapted to variably open and close, respectively a further fluid flow connection between the pump and the wheel brakes. In this way, the fluid pressure P4 delivered to the front axle wheel brakes will be the sum of the fluid pressures P1 and P3 in the first fluid line 55 and the further fluid line 67.

In a similar manner, the fluid line 67 is connected to the second fluid line 56 downstream of the position of the second pressure sensor 58. In this way, the fluid pressure P5 delivered to the bogie axle wheel brakes will be the sum of the fluid pressures P2 and P3 in the second fluid line 56 and the further fluid line 67.

The controller 59 is adapted to control the position of the further valve 65 via an electric signal. Thus, in addition to controlling the auxiliary brakes, the controller can affect the brake power of the wheel brakes on the basis of the input signal (s) to the controller.

In this way, the wheel brakes may be controlled to exert a larger brake power in situations where the brake power of the auxiliary brakes is less than desired, such as when the brake power has not yet reached the desired level (the engine brake and/or the transmission brake may have a delay with a few seconds), and during gear shifting when the brake power in the transmission brake is reduced in order to facilitate the gear shifting process.

The system further comprises a tank 69 for the hydraulic fluid and an accumulator 71 adapted for achieving a pressure equalization in the circuit.

The term "powertrain" used in the description above comprises the engine and the whole power-transmission system from the engine to the ground-engaging elements (wheels). The powertrain thus comprises clutch, gearbox (and any distribution gearbox), universal drive shaft (or universal drive shafts), transverse drive shafts, etc. Hydraulic, electrical and other driving systems are also included within the term "powertrain".

Further, the term "ground-engaging elements" includes wheels, caterpillar tracks, etc.

The invention is not in any way limited to the above described embodiments, instead a number of alternatives and modifications are possible without departing from the scope of the following claims.

The operative fluid in the system may be air instead of a hydraulic fluid.

The invention is of course not limited to using brakes on each of the ground engaging elements (wheels) in the vehicle. It may be sufficient to apply wheel brakes on a single pair of wheels, or on two pair of wheels.

The invention claimed is:

1. A method for braking a vehicle, wherein the vehicle comprises a circuit adapted for transmitting a brake signal from an operator controlled braking element to brake devices arranged at a plurality of ground engaging elements of the vehicle via a brake fluid, comprising
   detecting a fluid pressure in the circuit,
   using the detected fluid pressure level as an input for determining a brake power for at least one auxiliary brake in the vehicle, and
   controlling the auxiliary brake responsively in such a way that the brake power of the auxiliary brake is apportioned variably as a function of the detected pressure in the brake devices circuit.

2. A method according to claim 1, comprising detecting at least one vehicle operational parameter and using an operational parameter signal as a further input for determining the brake power for the at least one auxiliary brake.

3. A method according to claim 2, wherein the detected operational parameter is indicative oldie vehicle speed.

4. A method according to claim 3, comprising controlling brake power of the auxiliary brake proportionally to the vehicle speed.

5. A method according to claim 2, wherein the detected operational parameter is indicative of a current gear.

6. A method according to claim 5, comprising controlling brake power of the auxiliary brake proportionally to the current gear.

7. A method according to claim 2, wherein the detected operational parameter is indicative of a slip of one of the ground engaging element.

8. A method according to claim 7, comprising controlling brake power of the auxiliary brake inversely proportionally to slip.

9. A method according to claim 1, comprising determining a relationship between the brake power of the brake devices at the ground engaging elements and the brake power of the at least one auxiliary brake.

10. A method according to claim 1, comprising controlling brake power of the auxiliary brake proportionally to the detected fluid pressure.

11. A method according to claim 1, comprising determining the auxiliary brake power in response to an available cooling power of the brake devices.

12. A method according to claim 1, wherein the auxiliary brake comprises an engine brake.

13. A method according to claim 1, wherein the auxiliary brake comprises a transmission brake.

14. A method according to claim 1, wherein the operator controlled braking element is adapted to act directly on a valve, which is adapted to control a fluid flow to the brake devices.

15. A method according to claim 1, wherein the brake devices comprise a wet disk brake arranged at each of a plurality of the ground engaging elements.

16. A method according to claim 1, wherein the circuit for braking the vehicle's ground engaging elements is adapted to transmit the brake signal via a hydraulic fluid.

17. A method according to claim 1, wherein the operator controlled braking, element is formed by a foot operated pedal.

18. A computer on which a computer program comprising computer program segments for implementing the method as claimed in claim 1 is stored.

19. A tangible medium on which a computer program is stored for implementing the method as claimed in claim 1.

20. A system for braking a vehicle, wherein the system comprises
- a circuit adapted for transmitting a brake signal from an operator controlled braking element to brake devices arranged at a plurality of ground engaging elements of the vehicle via a brake fluid and means for detecting a fluid pressure in the circuit,
- means for determining a brake power for at least one auxiliary brake in the vehicle on the basis of the detected fluid pressure level, and
- means for controlling the auxiliary brake responsively in such a way that the brake power of the auxiliary brake is apportioned variably as a function of the detected pressure in the brake devices circuit.

21. A system according to claim 20, wherein the system comprises means for detecting at least one vehicle operational parameter and using an operational parameter signal as a further input for determining the brake power for the at least one auxiliary brake.

22. A system according to claim 20, wherein the auxiliary brake comprises an engine brake.

23. A system according to claim 20, wherein the auxiliary brake comprises a transmission brake.

24. A system according to claim 20, wherein the operator controlled braking element is adapted to act directly on a valve, which is adapted to control a fluid flow to the brake devices.

25. A system according to claim 20, wherein the brake devices comprise a wet disk brake arranged at each of a plurality of the ground engaging elements.

26. A system according to claim 20, wherein the circuit for braking the vehicle's ground engaging elements is adapted to transmit the brake signal via a hydraulic fluid.

27. A system according to claim 20, wherein the operator controlled braking element is formed by a foot operated pedal.

28. A vehicle, comprising the system according to claim 20.

29. A work machine, comprising the system according to claim 20.

30. An articulated hauler, comprising the system according to claim 20.

* * * * *